(12) United States Patent
Li et al.

(10) Patent No.: US 10,813,040 B2
(45) Date of Patent: Oct. 20, 2020

(54) METHOD AND APPARATUS FOR ACCESSING WI-FI NETWORK

(71) Applicant: Huawei Technologies Co., Ltd., Shenzhen (CN)

(72) Inventors: Weihua Li, Shanghai (CN); Zhan Guo, Shanghai (CN); Binbin Jiang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/201,563

(22) Filed: Nov. 27, 2018

(65) Prior Publication Data

US 2019/0098566 A1 Mar. 28, 2019

Related U.S. Application Data

(63) Continuation of application No. PCT/CN2016/105777, filed on Nov. 14, 2016.

(30) Foreign Application Priority Data

May 27, 2016 (CN) .......................... 2016 1 0370643

(51) Int. Cl.
*H04W 48/16* (2009.01)
*H04W 28/08* (2009.01)
(Continued)

(52) U.S. Cl.
CPC ............ *H04W 48/16* (2013.01); *H04L 69/12* (2013.01); *H04W 28/08* (2013.01); *H04W 76/10* (2018.02); *H04W 88/06* (2013.01); *H04W 84/12* (2013.01)

(58) Field of Classification Search
CPC ..... H04W 28/08; H04W 48/16; H04W 76/10; H04W 84/12; H04W 88/06
See application file for complete search history.

(56) References Cited

U.S. PATENT DOCUMENTS 9,268,561 B1 2/2016 Srinivasa et al.
2004/0199614 A1 10/2004 Shenfield et al.
(Continued)

FOREIGN PATENT DOCUMENTS

CN 202602915 U 12/2012
CN 102869031 A 1/2013
(Continued)

OTHER PUBLICATIONS

Machine Translation and Abstract of Japanese Publication No. JP2015159475, Sep. 3, 2015, 21 pages.
(Continued)

*Primary Examiner* — Mewale A Ambaye
(74) *Attorney, Agent, or Firm* — Conley Rose, P.C.

(57) ABSTRACT

A method and an apparatus for accessing a WI-FI network supporting a terminal in being coupled to two or more WI-FI networks at the same time, and therefore, WI-FI network is applied in a safer and more fluent manner. The method is applied to a terminal, the terminal includes N WI-FI access circuits and at least one processor, the at least one processor is configured to run a software program to form M containers, one container may be equivalent to one operating system, switch operation may be performed between different containers, each container corresponds to one WI-FI network access service, the M containers are capable of operating at the same time, tasks and data of different WI-FI network access services during operation of different containers are mutually isolated, and M and N are natural numbers greater than or equal to two.

16 Claims, 8 Drawing Sheets

When receiving an access request for accessing a first WI-FI network, a terminal accesses the first WI-FI network using a first WI-FI access circuit in N WI-FI access circuits — 500

On condition of using the first WI-FI access circuit to access the first WI-FI network, if the terminal receives an access request for accessing a second WI-FI network, the terminal accesses the second WI-FI network using a second WI-FI access circuit in the N WI-FI access circuits — 501

(51) Int. Cl.
  *H04W 88/06* (2009.01)
  *H04L 29/06* (2006.01)
  *H04W 76/10* (2018.01)
  *H04W 84/12* (2009.01)

(56) References Cited

U.S. PATENT DOCUMENTS

| | | | |
|---|---|---|---|
| 2004/0199648 A1 | 10/2004 | Shelest et al. | |
| 2008/0009324 A1 | 1/2008 | Patel | |
| 2009/0023426 A1* | 1/2009 | Shatzkamer | H04M 3/42246 455/414.1 |
| 2009/0156217 A1* | 6/2009 | Bajpai | H04W 36/14 455/439 |
| 2010/0110993 A1 | 5/2010 | Jain et al. | |
| 2013/0010773 A1 | 1/2013 | Hong et al. | |
| 2015/0220243 A1 | 8/2015 | Yang et al. | |
| 2015/0289136 A1* | 10/2015 | Hata | H04W 12/06 726/7 |
| 2017/0270797 A1* | 9/2017 | Lee | H04W 4/46 |
| 2018/0063298 A1 | 3/2018 | Fujii | |
| 2019/0098566 A1* | 3/2019 | Li | H04W 6/10 |

FOREIGN PATENT DOCUMENTS

| | | |
|---|---|---|
| CN | 103001702 A | 3/2013 |
| CN | 202873086 U | 4/2013 |
| CN | 103561172 A | 2/2014 |
| CN | 104516760 A | 4/2015 |
| CN | 105046156 A | 11/2015 |
| CN | 105227782 A | 1/2016 |
| CN | 105516397 A | 4/2016 |
| CN | 105592504 A | 5/2016 |
| CN | 205210862 U | 5/2016 |
| CN | 106102098 A | 11/2016 |
| EP | 3223151 A1 | 9/2017 |
| JP | H03115437 U | 11/1991 |
| JP | 2006520938 A | 9/2006 |
| JP | 2007116509 A | 5/2007 |
| JP | 2013243427 A | 12/2013 |
| JP | 2014523654 A | 9/2014 |
| JP | 2015159475 A | 9/2015 |
| KR | 20000007282 A | 2/2000 |
| KR | 20040088369 A | 10/2004 |
| KR | 20080113401 A | 12/2008 |
| WO | 2012093349 A2 | 7/2012 |

OTHER PUBLICATIONS

"CC3100MOD SimpleLink, Certified Wi-Fi Network Processor Internet-of-Things Module Solution for MCU Applications," CC3100MOD Datasheet, Texas Instruments, Dec. 2014, 3 pages.

Foreign Communication From a Counterpart Application, Japanese Application No. 2018-557032, Japanese Notice of Reasons for Rejection dated Nov. 5, 2019, 3 pages.

Foreign Communication From a Counterpart Application, Japanese Application No. 2018-557032, English Translation of Japanese Notice of Reasons for Rejection dated Nov. 5, 2019, 5 pages.

Chippy; "ASUS Transformer Book Trio TX201," UMPC Portal, Retrieved from the Internet: URL:https://www.umpcportal.com/2013/11/asus-transformer-book-trio-tx201-this-unique-2-in-1-is-nearing-availability/, XP002789605, Nov. 19, 2013, 3 pages.

Byrne, K., "Asus Transformer Book Trio TX201LA review," Retrieved from the Internet:URL:https://www.expertreviews.co.uk/laptops/53362/asus-transformer-book-trio-tx201la-review, Mar. 21, 2014, 2 pages.

Rijver., S., "Review: Asus Transformer Book Trio (TX201LA)," Retrieved from the Internet: URL:https://www.tabletsmagazine.nl/2014/03/review-asus-transformer-book-trio-bc201la/, XP002789607, Mar. 28, 2014, 5 pages.

Foreign Communication From a Counterpart Application, European Application No. 16902967.5, Extended European Search Report dated Mar. 28, 2019, 10 pages.

Machine Translation and Abstract of Chinese Publication No. CN105046156, Nov. 11, 2015, 16 pages.

Machine Translation and Abstract of Chinese Publication No. CN105227782, Jan. 6, 2016, 19 pages.

Machine Translation and Abstract of Chinese Publication No. CN105516397, Apr. 20, 2016, 20 pages.

Machine Translation and Abstract of Chinese Publication No. CN106102098, Nov. 9, 2016, 33 pages.

Machine Translation and Abstract of Chinese Publication No. CN205210862, May 4, 2016, 8 pages.

Foreign Communication From a Counterpart Application, Chinese Application No. 201610370643.4, Chinese Office Action dated Nov. 1, 2018, 7 pages.

Foreign Communication From a Counterpart Application, PCT Application No. PCT/CN2016/105777, English Translation of International Search Report dated Feb. 9, 2017, 3 pages.

Foreign Communication From a Counterpart Application, PCT Application No. PCT/CN2016/105777, English Translation of Written Opinion dated Feb. 9, 2017, 5 pages.

Machine Translation and Abstract of Chinese Publication No. CN101155389, Apr. 2, 2008, 13 pages.

Machine Translation and Abstract of Chinese Publication No. CN102893691, Jan. 23, 2013, 33 pages.

Machine Translation and Abstract of Korean Publication No. KR20000007282, Feb. 7, 2000, 6 pages.

Foreign Communication From a Counterpart Application, Korean Application No. 10-2018-7033219, Korean Notice of Preliminary Rejection dated Nov. 22, 2019, 5 pages.

\* cited by examiner

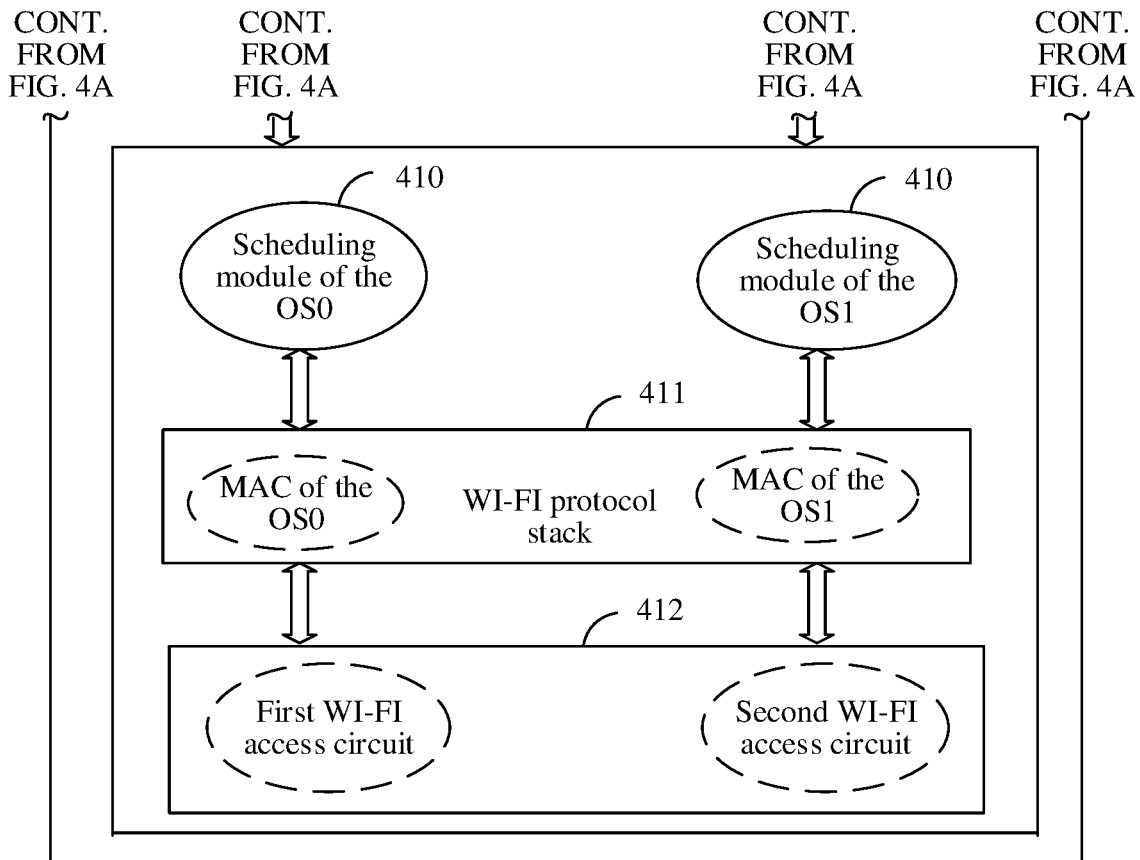

FIG. 4B

When receiving an access request for accessing a first WI-FI network, a terminal accesses the first WI-FI network using a first WI-FI access circuit in N WI-FI access circuits ⟶ 500

On condition of using the first WI-FI access circuit to access the first WI-FI network, if the terminal receives an access request for accessing a second WI-FI network, the terminal accesses the second WI-FI network using a second WI-FI access circuit in the N WI-FI access circuits ⟶ 501

FIG. 5

METHOD AND APPARATUS FOR ACCESSING WI-FI NETWORK

CROSS-REFERENCE TO RELATED APPLICATIONS

This application is a continuation of International Patent Application No. PCT/CN2016/105777 filed on Nov. 14, 2016, which claims priority to Chinese Patent Application No. 201610370643.4 filed on May 27, 2016. The disclosures of the aforementioned applications are hereby incorporated by reference in their entireties.

TECHNICAL FIELD

This application relates to the field of WI-FI technologies, and in particular, to a method and an apparatus for accessing a WI-FI network.

BACKGROUND

WI-FI allows a terminal to be connected to a wireless local area network (WLAN), and generally operates on a radio frequency band of 2.4 gigahertz (GHz) or 5 GHz. Like a BLUETOOTH technology, a WI-FI technology is also a short-range wireless communications technology, is a network transmission standard, and has already been widely applied to daily life. For example, in areas such as a house, an airport, a coffee shop, and a shopping mall, a user can experience a high-speed network using a mobile electronic device (that is, a terminal) to access a WI-FI access point (AP) or a WI-FI hotspot.

During use, sometimes, a terminal may need to access two WI-FI APs at the same time, or a terminal has a WI-FI dual connectivity requirement. Currently, the terminal may be connected to two different WI-FI networks using two independent WI-FI connection channels such that the two WI-FI networks operate on a same frequency band or different radio frequency bands. For example, one WI-FI network connected to the terminal operates on a radio frequency band of 2.4 GHz and the other WI-FI network operates on a radio frequency band of 5 GHz. Alternatively, the two WI-FI networks each operate on a radio frequency band of 5 GHz. In such a WI-FI dual connectivity technology, data traffic can be improved, multiple types of applications can be supported, and the like.

An existing WI-FI dual connectivity technology is implemented mostly based on a terminal hardware design and with a lack of an appropriate software layer design. Therefore, how to design an appropriate software architecture to support WI-FI dual connectivity becomes a problem.

SUMMARY

Embodiments of this application provide a method and an apparatus for accessing a WI-FI network by a terminal in order to support the terminal in being connected to two or more WI-FI networks at the same time, and therefore, WI-FI network is applied in a safer and more fluent manner.

The embodiments of this application provide the following specific technical solutions.

According to one aspect, an embodiment of this application provides a method for accessing a WI-FI network. The method is applied to a terminal, the terminal includes N WI-FI access circuits and at least one processor, the at least one processor is configured to run a software program to form M containers, one container may be equivalent to one operating system, switch operation may be performed between different containers, each container corresponds to one WI-FI network access service, the M containers are capable of operating at the same time, tasks and data of different WI-FI network access services during operation of different containers are mutually isolated, and M and N are natural numbers greater than or equal to 2. The method includes accessing, by the terminal when a first container in the M containers operates, a first WI-FI network using a first WI-FI access circuit in the N WI-FI access circuits, and accessing, by the terminal, a second WI-FI network using a second WI-FI access circuit in the N WI-FI access circuits when the terminal switches from operation of the first container to operation of a second container in the M containers, where the first container continues operating in a background running manner, and the terminal continues using the first WI-FI access circuit to access the first WI-FI network. In this way, when switching to the operation of the second container, the terminal uses the second WI-FI access circuit to access the second WI-FI network. The first WI-FI access circuit and the second WI-FI access circuit are mutually independent, and therefore, the terminal can continue using the first WI-FI access circuit in the background to access the first WI-FI network, and a service is not disconnected such that WI-FI network application is safer, the service is more fluent, and user experience is improved.

In a possible design, accessing, by the terminal when a first container operates, a first WI-FI network using a first WI-FI access circuit in the N WI-FI access circuits includes accessing, by the terminal, the first WI-FI network according to a preset mapping relationship between containers and WI-FI access circuits using the first WI-FI access circuit corresponding to the first container in the N WI-FI access circuits, and accessing, by the terminal, a second WI-FI network using a second WI-FI access circuit in the N WI-FI access circuits when the terminal switches to operation of a second container includes accessing, by the terminal, the second WI-FI network according to the mapping relationship using the second WI-FI access circuit corresponding to the second container in the N WI-FI access circuits.

In a possible design, the terminal further includes a WI-FI processor, accessing, by the terminal, the first WI-FI network according to a preset mapping relationship between containers and WI-FI access circuits using the first WI-FI access circuit corresponding to the first container in the N WI-FI access circuits includes accessing, by the WI-FI processor of the terminal, the first WI-FI network according to the preset mapping relationship between containers and WI-FI access circuits using the first WI-FI access circuit corresponding to the first container in the N WI-FI access circuits, and accessing, by the terminal, the second WI-FI network according to the mapping relationship using the second WI-FI access circuit corresponding to the second container in the N WI-FI access circuits includes accessing, by the WI-FI processor of the terminal, the second WI-FI network according to the mapping relationship using the second WI-FI access circuit corresponding to the second container in the N WI-FI access circuits. In this way, when the terminal switches between the operation of different containers, the WI-FI processor uses different WI-FI access circuits to access different WI-FI networks such that a WI-FI network disconnection due to a hardware design disadvantage during switch operation between a foreground operating system and a background operating system does not happen.

In a possible design, when the first WI-FI network is accessed using the first WI-FI access circuit corresponding to the first container in the N WI-FI access circuits, the method further includes performing, by the WI-FI processor of the terminal, at least one of channel resource scheduling, Media Access Control, or encryption/decryption related to accessing the first WI-FI network, and when the second WI-FI network is accessed using the second WI-FI access circuit corresponding to the second container in the N WI-FI access circuits, the method further includes performing, by the WI-FI processor of the terminal, at least one of channel resource scheduling, Media Access Control, or encryption/decryption related to accessing the second WI-FI network.

In a possible design, each container is configured to implement at least one of a user interface function of a corresponding WI-FI network access service, maintenance of an AP start state, or maintenance of a station peer to peer network start state.

In a possible design, both M and N are equal to 2.

According to another aspect, an embodiment of this application provides a method for accessing a WI-FI network. The method is applied to a terminal, the terminal includes N WI-FI access circuits and at least one processor, the at least one processor is configured to run a software program to form a container, the container may also be referred to as an operating system, and the container supports both a first WI-FI network access service and a second WI-FI network access service. The method includes accessing, by the terminal, the first WI-FI network using a first WI-FI access circuit in the N WI-FI access circuits when receiving an access request for accessing the first WI-FI network, on condition of using the first WI-FI access circuit to access the first WI-FI network, if the terminal receives an access request for accessing the second WI-FI network, accessing, by the terminal, the second WI-FI network using a second WI-FI access circuit in the N WI-FI access circuits, and synchronously displaying, by the terminal, a first WI-FI network access identifier and a second WI-FI network access identifier on a display interface corresponding to the container, where the first WI-FI network access identifier represents that the first WI-FI network is accessed, and the second WI-FI network access identifier represents that the second WI-FI network is accessed, and N is a natural number greater than or equal to 2. According to the foregoing method, one terminal can be connected to two or more different WI-FI APs at the same time, that is, a WI-FI dual standby or multi-standby function is implemented such that a WI-FI network is not disconnected during switch operation between two WI-FI APs, a service is more fluent, and user experience is improved. A new interface manner is provided such that at least two WI-FI identifiers can be displayed on the display interface of the terminal, and a display manner of WI-FI dual standby display or WI-FI multi-standby display is implemented.

In a possible design, after the terminal accesses the first WI-FI network and the second WI-FI network, the terminal synchronously displays connection signal strength of the first WI-FI network and connection signal strength of the second WI-FI network on the display interface.

In a possible design, after the terminal accesses the first WI-FI network and the second WI-FI network, the method further includes selecting, by the terminal according to a detected WI-FI network connection manner entered by a user, at least one of the first WI-FI network or the second WI-FI network to carry a data service.

In a possible design, the WI-FI network connection manner is used by the user to select a WI-FI network to carry the data service. After the terminal accesses the first WI-FI network and the second WI-FI network, the terminal selects, from the first WI-FI network and the second WI-FI network according to the detected WI-FI network connection manner entered by the user, a WI-FI network having higher connection signal strength to carry the data service. Alternatively, the terminal selects, according to the detected WI-FI network connection manner entered by the user, a WI-FI network designated by the user, to carry the data service. Alternatively, the terminal selects, according to the detected WI-FI network connection manner entered by the user and according to a load balancing policy, the first WI-FI network and the second WI-FI network to carry the data service together. In this way, a preferred WI-FI is selected, a service of the obtained WI-FI network is better, multiple WI-FI systems are used to implement WI-FI multi-system concurrence, and different WI-FI systems are used for different services such that all the different services can obtain more fluent network services.

In a possible design, that the terminal selects, according to the load balancing policy, the first WI-FI network and the second WI-FI network to carry the data service together includes the following. The terminal uses, according to a traffic balancing policy of the first WI-FI network and the second WI-FI network, the first WI-FI network and the second WI-FI network to carry the data service. Alternatively, the terminal uses, according to a service request quantities balancing policy of the first WI-FI network and the second WI-FI network, the first WI-FI network and the second WI-FI network to carry the data service. In this way, when different WI-FI networks carry the data service together, traffic can be balanced.

In a possible design, the terminal further includes a WI-FI processor, and the method further includes performing, by the WI-FI processor of the terminal, at least one of channel resource scheduling, Media Access Control, or encryption/decryption related to accessing the first WI-FI network and the second WI-FI network.

In a possible design, the container is configured to implement at least one of a user interface function of a corresponding WI-FI network access service, maintenance of an AP start state, or maintenance of a station peer to peer network start state.

According to still another aspect, an embodiment of this application provides an apparatus for accessing a WI-FI network. The apparatus includes M containers that are capable of operating at the same time and a WI-FI module, each container corresponds to one WI-FI network access service, tasks and data of different WI-FI network access services during operation of different containers are mutually isolated, and the M containers include a first container and a second container, the WI-FI module is configured to access a first WI-FI network using a first WI-FI access circuit when the first container operates, and access a second WI-FI network using the second WI-FI access circuit when the apparatus switches from operation of the first container to operation of the second container, and the first container is further configured to continue operating in a background running manner when the WI-FI module accesses the second WI-FI network using the second WI-FI access circuit, and the WI-FI module is further configured to continue using the first WI-FI access circuit to access the first WI-FI network, where M and N are natural numbers greater than or equal to 2. In this way, when switching to the operation of the second container, the terminal uses the second WI-FI access circuit to access the second WI-FI network. The first WI-FI access circuit and the second WI-FI access circuit are mutually independent, and therefore, the terminal can continue using the first WI-FI access circuit in the background to access the first WI-FI network, and a service is not disconnected such that WI-FI network application is safer, the service is more fluent, and user experience is improved.

In a possible design, the WI-FI module is configured to access the first WI-FI network according to a preset mapping relationship between containers and WI-FI access circuits using the first WI-FI access circuit corresponding to the first container, and access the second WI-FI network according to the mapping relationship using the second WI-FI access circuit corresponding to the second container.

In a possible design, when accessing the first WI-FI network using the first WI-FI access circuit corresponding to the first container, the WI-FI module is further configured to perform at least one of channel resource scheduling, Media Access Control, or encryption/decryption related to accessing the first WI-FI network, and perform at least one of channel resource scheduling, Media Access Control, or encryption/decryption related to accessing the second WI-FI network when accessing the second WI-FI network using the second WI-FI access circuit corresponding to the second container.

In a possible design, each container is configured to implement at least one of a user interface function of a corresponding WI-FI network access service, maintenance of an AP start state, or maintenance of a station peer to peer network start state.

In a possible design, both M and N are equal to 2.

According to still another aspect, an embodiment of this application provides an apparatus for accessing a WI-FI network. The apparatus includes a container supporting both a first WI-FI network access service and a second WI-FI network access service and a WI-FI module, and the container includes a display module, the WI-FI module is configured to access the first WI-FI network using a first WI-FI access circuit when an access request for accessing the first WI-FI network is received, and on condition of using the first WI-FI access circuit to access the first WI-FI network, if an access request for accessing the second WI-FI network is received, access the second WI-FI network using the second WI-FI access circuit, and the display module is configured to synchronously display a first WI-FI network access identifier and a second WI-FI network access identifier on a display interface corresponding to the container after the WI-FI module accesses the first WI-FI network and the second WI-FI network, where the first WI-FI network access identifier represents that the first WI-FI network is accessed, and the second WI-FI network access identifier represents that the second WI-FI network is accessed. According to the foregoing method, one terminal can be connected to two or more different WI-FI APs at the same time, that is, a WI-FI dual standby or multi-standby function is implemented such that a WI-FI network is not disconnected during switch operation between two WI-FI APs, a service is more fluent, and user experience is improved. A new interface display manner is provided such that at least two WI-FI identifiers can be displayed on the display interface of the terminal, and a display manner of WI-FI dual standby display or WI-FI multi-standby display is implemented.

In a possible design, the display module is further configured to synchronously display connection signal strength of the first WI-FI network and connection signal strength of the second WI-FI network on the display interface.

In a possible design, the apparatus or the container further includes a service distribution module, and the service distribution module is configured to select, according to a detected WI-FI network connection manner entered by a user, at least one of the first WI-FI network or the second WI-FI network to carry a data service after the WI-FI module accesses the first WI-FI network and the second WI-FI network.

In a possible design, the WI-FI network connection manner is used by the user to select a WI-FI network to carry the data service. After the terminal accesses the first WI-FI network and the second WI-FI network, the terminal selects, from the first WI-FI network and the second WI-FI network according to the detected WI-FI network connection manner entered by the user, a WI-FI network having higher connection signal strength to carry the data service. Alternatively, the terminal selects, according to the detected WI-FI network connection manner entered by the user, a WI-FI network designated by the user, to carry the data service Alternatively, the terminal selects, according to the detected WI-FI network connection manner entered by the user and according to a load balancing policy, the first WI-FI network and the second WI-FI network to carry the data service together. In this way, a preferred WI-FI is selected, a service of the obtained WI-FI network is better, multiple WI-FI systems are used to implement WI-FI multi-system concurrence, and different WI-FI systems are used for different services such that all the different services can obtain more fluent network services.

In a possible design, that the terminal selects, according to the load balancing policy, the first WI-FI network and the second WI-FI network to carry the data service together includes the following. The terminal uses, according to a traffic balancing policy of the first WI-FI network and the second WI-FI network, the first WI-FI network and the second WI-FI network to carry the data service. Alternatively, the terminal uses, according to a service request quantities balancing policy of the first WI-FI network and the second WI-FI network, the first WI-FI network and the second WI-FI network to carry the data service. In this way, when different WI-FI networks carry the data service together, traffic can be balanced.

In a possible design, the WI-FI module is further configured to perform at least one of channel resource scheduling, Media Access Control, or encryption/decryption related to accessing the first WI-FI network and the second WI-FI network.

In a possible design, the container is configured to implement at least one of a user interface function of a corresponding WI-FI network access service, maintenance of an AP start state, or maintenance of a station peer to peer network start state.

According to yet another aspect, an embodiment of this application provides a terminal, including a WI-FI processor, N WI-FI access circuits, a memory, and at least one processor. The memory is configured to store a software program, the at least one processor is coupled to the memory, and is configured to read the software program from the memory and run the software program to form M containers, where the M containers are capable of operating at the same time, each container corresponds to one WI-FI network access service, and tasks and data of different WI-FI network access services during operation of different containers are mutually isolated, the WI-FI processor is configured to access a first WI-FI network using a first WI-FI access circuit in the N WI-FI access circuits when a first container in the M containers operates, and access a second WI-FI network using a second WI-FI access circuit in the N WI-FI access circuits when the terminal switches from the operation of the first container to operation of a second container in the M containers, and the at least one processor is further configured to continue running the first container in a background running manner when the WI-FI processor accesses the second WI-FI network using the second WI-FI access circuit, and the WI-FI processor is further configured to continue using the first WI-FI access circuit to access the first WI-FI network, where each of the N WI-FI access circuits is used for access to one corresponding WI-FI network, and M and N are natural numbers greater than or equal to 2. In this way, when switching to the operation of the second container, the terminal uses the second WI-FI access circuit to access the second WI-FI network. The first WI-FI access circuit and the second WI-FI access circuit are mutually independent, and therefore, the terminal can continue using the first WI-FI access circuit in the background to access the first WI-FI network, and a service is not disconnected such that WI-FI network application is safer, the service is more fluent, and user experience is improved.

In a possible design, the WI-FI processor is configured to access the first WI-FI network according to a preset mapping relationship between containers and WI-FI access circuits using the first WI-FI access circuit corresponding to the first container in the N WI-FI access circuits, and access the second WI-FI network according to the mapping relationship using the second WI-FI access circuit corresponding to the second container in the N WI-FI access circuits.

In a possible design, the WI-FI processor is further configured to perform at least one of channel resource scheduling, Media Access Control, or encryption/decryption related to accessing the first WI-FI network when accessing the first WI-FI network using the first WI-FI access circuit corresponding to the first container in the N WI-FI access circuits, and perform at least one of channel resource scheduling, Media Access Control, or encryption/decryption related to accessing the second WI-FI network when accessing the second WI-FI network using the second WI-FI access circuit corresponding to the second container in the N WI-FI access circuits.

In a possible design, each container is configured to implement at least one of a user interface function of a corresponding WI-FI network access service, maintenance of an AP start state, or maintenance of a station peer to peer network start state.

In a possible design, both M and N are equal to 2.

According to yet another aspect, an embodiment of this application provides a terminal. The terminal includes a WI-FI processor, N WI-FI access circuits, a memory, and at least one processor. The memory is configured to store a software program, the at least one processor is coupled to the memory, and is configured to read the software program from the memory and run the software program to form a container, where the container supports both a first WI-FI network access service and a second WI-FI network access service, the WI-FI processor is configured to access the first WI-FI network using a first WI-FI access circuit in the N WI-FI access circuits when an access request for accessing the first WI-FI network is received, and on condition of using the first WI-FI access circuit to access the first WI-FI network, if an access request for accessing the second WI-FI network is received, access the second WI-FI network using a second WI-FI access circuit in the N WI-FI access circuits, and the at least one processor is configured to drive a display interface corresponding to the container to synchronously display a first WI-FI network access identifier and a second WI-FI network access identifier, where the first WI-FI network access identifier represents that the first WI-FI network is accessed, and the second WI-FI network access identifier represents that the second WI-FI network is accessed, and N is a natural number greater than or equal to 2. According to the foregoing method, one terminal can be connected to two or more different WI-FI APs at the same time, that is, a WI-FI dual standby or multi-standby function is implemented such that a WI-FI network is not disconnected during switch operation between two WI-FI APs, a service is more fluent, and user experience is improved. A new interface manner is provided such that at least two WI-FI identifiers can be displayed on the display interface of the terminal, and a display manner of WI-FI dual standby display or WI-FI multi-standby display is implemented.

In a possible design, the terminal further includes a display, and the display interface is displayed on the display.

In a possible design, the at least one processor is further configured to drive the display interface to synchronously display connection signal strength of the first WI-FI network and connection signal strength of the second WI-FI network.

In a possible design, the WI-FI processor is further configured to after accessing the first WI-FI network and the second WI-FI network, select, according to a detected WI-FI network connection manner entered by a user, at least one of the first WI-FI network or the second WI-FI network to carry a data service.

In a possible design, the WI-FI network connection manner is used by the user to select a WI-FI network to carry the data service. After the terminal accesses the first WI-FI network and the second WI-FI network, the terminal selects, from the first WI-FI network and the second WI-FI network according to the detected WI-FI network connection manner entered by the user, a WI-FI network having higher connection signal strength to carry the data service. Alternatively, the terminal selects, according to the detected WI-FI network connection manner entered by the user, a WI-FI network designated by the user, to carry the data service. Alternatively, the terminal selects, according to the detected WI-FI network connection manner entered by the user and according to a load balancing policy, the first WI-FI network and the second WI-FI network to carry the data service together. In this way, a preferred WI-FI is selected, a service of the obtained WI-FI network is better, multiple WI-FI systems are used to implement WI-FI multi-system concurrence, and different WI-FI systems are used for different services such that all the different services can obtain more fluent network services.

In a possible design, that the terminal selects, according to the load balancing policy, the first WI-FI network and the second WI-FI network to carry the data service together includes the following. The terminal uses, according to a traffic balancing policy of the first WI-FI network and the second WI-FI network, the first WI-FI network and the second WI-FI network to carry the data service. Alternatively, the terminal uses, according to a service request quantities balancing policy of the first WI-FI network and the second WI-FI network, the first WI-FI network and the second WI-FI network to carry the data service. In this way, when different WI-FI networks carry the data service together, traffic can be balanced.

In a possible design, the WI-FI processor is further configured to perform at least one of channel resource scheduling, Media Access Control, or encryption/decryption related to accessing the first WI-FI network and the second WI-FI network.

In a possible design, the container is further configured to implement at least one of a user interface function of a corresponding WI-FI network access service, maintenance of an AP start state, or maintenance of a station peer to peer network start state.

According to the terminal provided in the embodiments of this application, the terminal can be supported in being connected to two or more WI-FI networks at the same time using a software layer design such that WI-FI network is applied in a safer and more fluent manner.

BRIEF DESCRIPTION OF DRAWINGS

FIG. 4A and FIG. 4B are a schematic diagram of an internal structure stack of a terminal according to an embodiment of this application;

FIG. 5 is a flowchart of a method for accessing a WI-FI network according to an embodiment of this application;

DESCRIPTION OF EMBODIMENTS

To make the objectives, technical solutions, and advantages of this application clearer, the following further describes this application in detail with reference to the accompanying drawings. The described embodiments are merely some rather than all of the embodiments of this application. All other embodiments obtained by persons of ordinary skill in the art based on the embodiments of this application without creative efforts shall fall within the protection scope of this application.

In view of a fact that an existing WI-FI dual connectivity technology is implemented mostly based on a terminal hardware design and with a lack of an appropriate software layer design, according to a terminal provided in the embodiments of this application, an appropriate software architecture is designed such that WI-FI dual connectivity and even multi-connectivity of more than two WI-FI connections are supported.

In the embodiments of this application, design is performed for a terminal with two or more operating systems, and in addition, design is performed for a terminal with one operating system. Detailed descriptions are respectively provided below.

Currently, a terminal with dual operating systems has been applied. The terminal has two independent operating systems. It may be considered that two containers can operate in the terminal, and there is a safe distance between the two containers in order to ensure that tasks and data are mutually isolated during operation of the two containers, and ensure privacy of each operating system. When using the terminal with dual operating systems, a user may use one operating system to execute a business task, and use the other operating system to execute a personal task such that business information or personal information safety can be ensured when the user performs switch operation between different operating systems. However, in a process of switch operation between operating systems, the operating systems need to be connected to different WI-FI APs. In view of the foregoing problem, the embodiments of this application provide a method and an apparatus for accessing a WI-FI network and a terminal. The terminal mentioned includes at least two WI-FI access circuits and can form at least two containers, and when different containers operate, the terminal uses different WI-FI access circuits to access corresponding WI-FI networks. In this way, it can be ensured that a WI-FI network connection is not disconnected when a terminal switches between different operating systems such that WI-FI network application is safer, a service is more fluent, and user experience is improved.

Optionally, the operating system mentioned in the embodiments may be an operating system such as ANDROID, IOS, or WINDOWS. The terminal mentioned in the embodiments of this application may be a mobile electronic device such as a mobile phone, a notebook computer, or a tablet computer.

Figure 1:
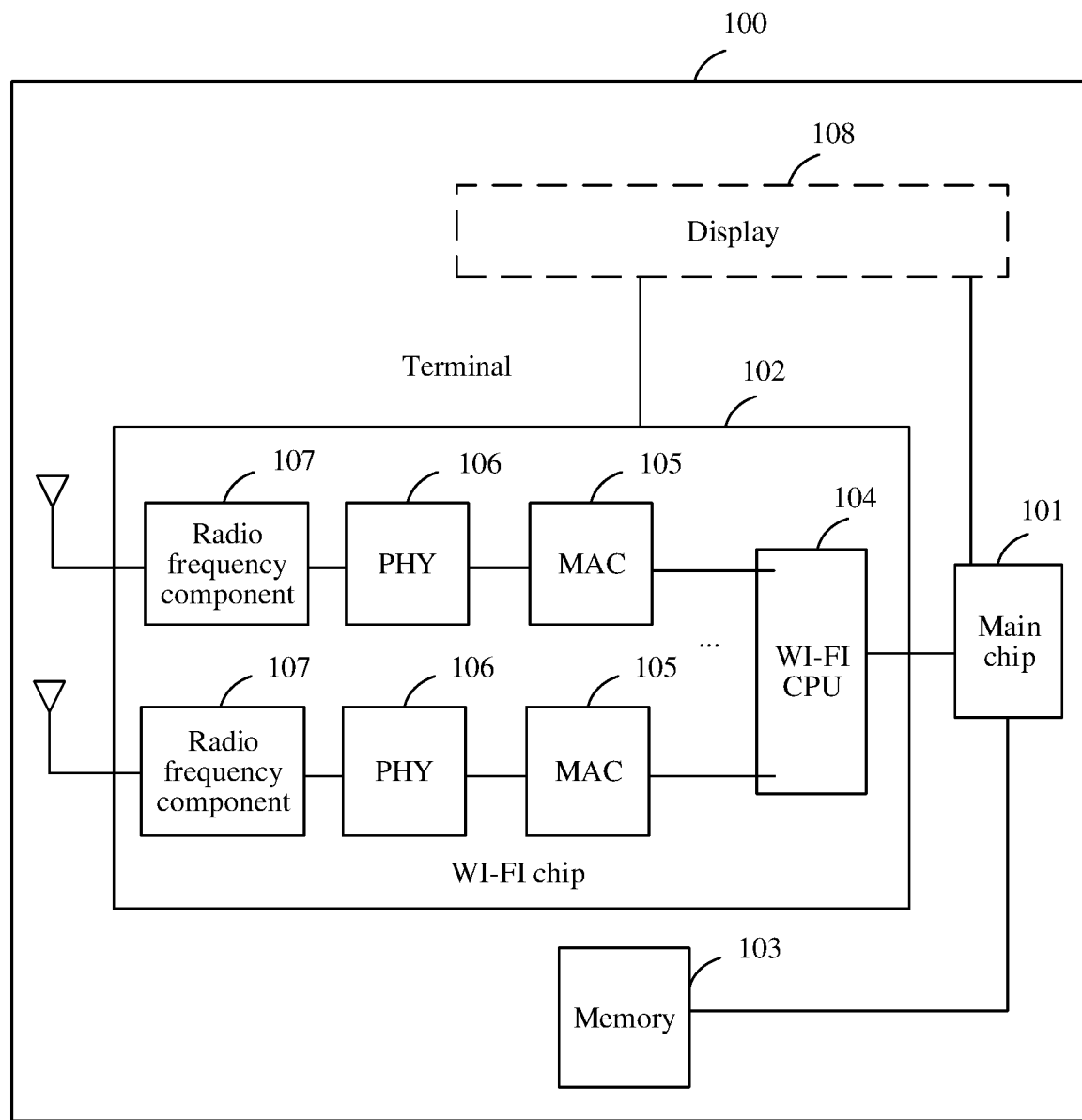
FIG. 1 is a schematic structural diagram of a terminal according to an embodiment of this application.

Referring to FIG. 1, a terminal 100 in an embodiment of this application includes a main chip 101, a WI-FI chip 102, and a memory 103. The memory 103 is configured to store a software program. An operating system that can be used by the terminal 100 is loaded in the main chip 101. The operating system includes at least one body, that is, a main central processing unit (CPU), that uses the WI-FI chip 102, and the main CPU is hereinafter briefly referred to as a processor. The at least one processor is coupled to the memory 103, and is configured to read the software program from the memory 103 to run the operating system and application software. A WI-FI CPU (that is, a WI-FI processor) 104 is loaded in the WI-FI chip 102. The WI-FI CPU 104 is a WI-FI chip kernel processor, and mainly implements a WI-FI-related operation function, for example, is responsible for congestion control, carrier aggregation, frame filtering, key control, frame receiving/transmission management, and the like. It may be understood that the main chip 101 and the WI-FI chip 102 may be integrated into one chip.

N WI-FI access circuits are integrated into the WI-FI chip 102, and N is a natural number greater than or equal to 2. Each of the N WI-FI access circuits is used for access to one corresponding WI-FI network, and each WI-FI access circuit corresponds to one independent Media Access Control (also referred to as MAC) 105 and one independent physical layer (PHY) 106. N MACs 105 and N PHYs 106 share one WI-FI CPU 104, and can receive/transmit data at the same time in order to implement a dual-band dual-concurrent (DBDC) function. Functions of the MAC 105 mainly include channel access, group deframing, data receiving/transmission, encryption/decryption, and energy conservation control. As shown in FIG. 1, the MAC 105 may be implemented using independent hardware such as an independent digital signal processor (DSP). Certainly, the MAC 105 may be implemented using the WI-FI CPU 104, that is, functions of the MAC 105 are implemented using the WI-FI CPU 104. FIG. 1 is merely used for reference, and does not impose any limitation. The PHY 106 mainly implements a physical layer function such as digital baseband processing. The WI-FI chip 102 further includes a radio frequency component 107. The radio frequency component 107 converts a baseband signal processed by the MAC 105 and the PHY 106 into a radio frequency signal during transmission, and converts a radio frequency signal received from an antenna into a baseband signal during receiving such that the PHY 106 and the MAC 105 perform further processing. It may be understood that the WI-FI CPU 104 may be replaced with a DSP or an independent field programmable gate array (FPGA)

chip. A specific form of a processor implementing WI-FI processing may be flexible. FIG. 1 is merely used for reference, and does not impose any limitation.

In this embodiment of this application, the at least one processor in the main chip 101 may run the software program to form M containers. M is a natural number greater than or equal to 2, and generally, M=2. Each container corresponds to one operating system, the M containers are capable of operating at the same time, each container corresponds to one WI-FI network access service, the terminal 100 uses different operating systems when different containers operate, and tasks and data of different WI-FI network access services during operation of different containers are mutually isolated, that is, each container has an independent task and independent data, and different containers correspond to tasks that do not interfere with each other and data that does not interfere with each other. During switch operation between different operating systems, the terminal 100 switches between the operation of different containers. Different containers need to be safely isolated from each other in order to ensure that information about data generated during operation of any two different containers does not interact with each other. Therefore, privacy of each operating system is ensured. The two operating systems may be of different types such as an ANDROID system and a WINDOWS system, or may be of a same type such as dual ANDROID systems. Two operating systems of a same type that implement dual-WI-FI concurrence may use different kernels, or may use a same kernel, but in the two systems or two containers, data is isolated and user operations are isolated in a specific manner. Currently, a dual-container intelligent terminal is relatively widely applied. One operating system may be corresponding to business application, and the other operating system may be corresponding to personal application. This can ensure that business information and personal information do not interfere with each other in order to ensure privacy. The method provided in this application may be applied to a terminal in which at least two containers operate, and optionally, applied to a dual-container terminal. The container is software that keeps together an operating system program or an application program and a running component of the operating system program or the application program. For example, the container is configured to pack the operating system program or the application program, a library, and another binary file required for running of the operating system program or the application program such that an independent operating system environment can be provided for the operating system program or the application program. Generally, each software container may include at least a part of a corresponding operating system. Alternatively, each software container may not include an operating system kernel, and in this case, the container may be faster and more flexible than a virtual machine. In this embodiment, one container may be corresponding to one operating system, and two operating systems may be mutually isolated such that operations of the two operating systems do not interfere with each other.

It may be understood that the container mentioned in each embodiment of this application may include one of at least a part of a corresponding operating system (that may selectively include or not include an operating system kernel), a corresponding application program, a corresponding component, corresponding middleware, or a corresponding database, or a combination thereof. For example, as a software functional entity executed by the main CPU, the container may be configured to implement at least one of a user interface function of a corresponding WI-FI network access service, maintenance of an AP start state, or maintenance of a station peer to peer network start state.

The WI-FI CPU 104 is configured to access a first WI-FI network using a first WI-FI access circuit in the N WI-FI access circuits when a first container in the M containers operates, and access a second WI-FI network using a second WI-FI access circuit in the N WI-FI access circuits when the terminal 100 switches from the operation of the first container to operation of a second container in the M containers. The at least one processor is further configured to continue running the first container in a background running manner when the WI-FI CPU 104 accesses the second WI-FI network using the second WI-FI access circuit, and the WI-FI CPU 104 is further configured to continue using the first WI-FI access circuit to access the first WI-FI network in order to ensure that a WI-FI network connection is not disconnected during switch operation between a foreground operating system and a background operating system.

Optionally, when using a WI-FI access circuit to access a corresponding WI-FI network, the WI-FI CPU 104 accesses the first WI-FI network according to a preset mapping relationship between containers and WI-FI access circuits using the first WI-FI access circuit corresponding to the first container in the N WI-FI access circuits, and accesses the second WI-FI network according to the mapping relationship using the second WI-FI access circuit corresponding to the second container in the N WI-FI access circuits. In addition, when accessing the first WI-FI network using the first WI-FI access circuit corresponding to the first container in the N WI-FI access circuits, the WI-FI CPU 104 performs at least one of channel resource scheduling, Media Access Control, or encryption/decryption related to accessing the first WI-FI network, and when accessing the second WI-FI network using the second WI-FI access circuit corresponding to the second container in the N WI-FI access circuits, the WI-FI CPU 104 performs at least one of channel resource scheduling, Media Access Control, or encryption/decryption related to accessing the second WI-FI network.

Based on the structural diagram of the terminal 100 shown in FIG. 1, with reference to the accompanying drawings, the following describes in detail an implementation method, provided in the embodiments of this application, for ensuring that neither of WI-FI network connections in the foreground and the background is disconnected when a terminal switches between different operating systems. In the embodiments of this application, switch operation between operating systems or corresponding containers is switch operation of the operating systems or the containers between the foreground and the background. An operating system or a container is switched from the background to the foreground, and an operating system or a container that originally operates in the foreground is switched to the background. Such switch operation does not cause disconnection of a WI-FI connection corresponding to an operating system running in the background, and corresponding WI-FI data transmission is not disconnected in order to implement a WI-FI dual connectivity and simultaneous data transmission. When an operating system or a container is in a foreground operating state, data or a process of the operating system or the container may be displayed to a user using a user interface (also referred to as UI). When an operating system or a container is in a background operating state, data or a process of the operating system or the container is not displayed to a user using a user interface.

Figure 2:
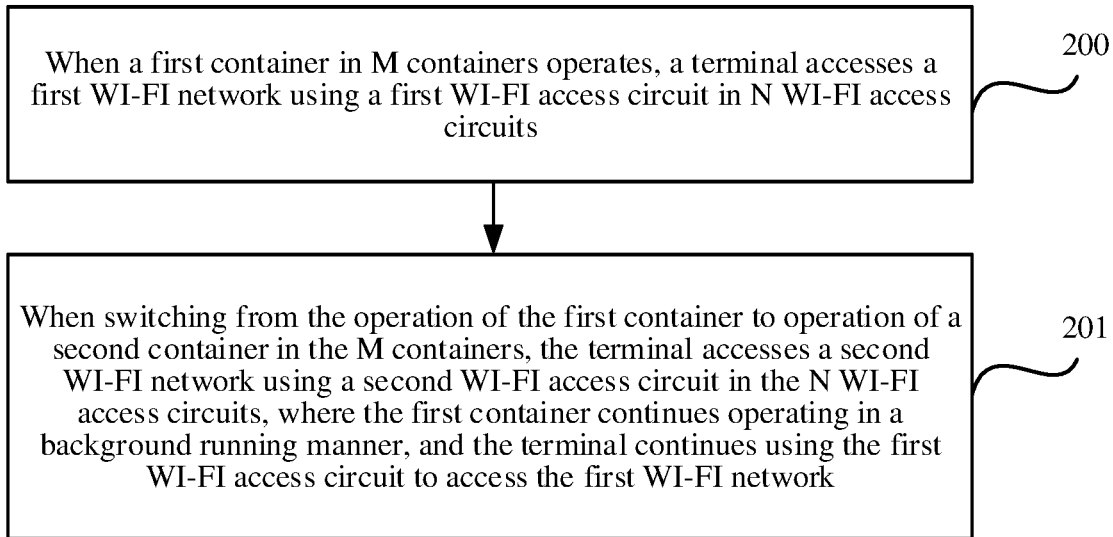
FIG. 2 is a flowchart of a method for accessing a WI-FI network according to an embodiment of this application.

As shown in FIG. 2, a procedure of a method for accessing a WI-FI network provided in an embodiment of this application is as follows.

Step 200: When a first container in M containers operates, a terminal accesses a first WI-FI network using a first WI-FI access circuit in N WI-FI access circuits.

Step 201: When switching from the operation of the first container to operation of a second container in the M containers, the terminal accesses a second WI-FI network using a second WI-FI access circuit in the N WI-FI access circuits, where the first container continues operating in a background running manner, and the terminal continues using the first WI-FI access circuit to access the first WI-FI network.

According to the foregoing method, when switching to the operation of the second container, the terminal uses the second WI-FI access circuit to access the second WI-FI network. The first WI-FI access circuit and the second WI-FI access circuit are mutually independent, and therefore, the terminal can continue using the first WI-FI access circuit in the background to access the first WI-FI network, and a service is not disconnected.

In a specific implementation process, the terminal presets a mapping relationship between containers and WI-FI access circuits, accesses the first WI-FI network according to the preset mapping relationship between containers and WI-FI access circuits using the first WI-FI access circuit corresponding to the first container in the N WI-FI access circuits, and accesses the second WI-FI network using the second WI-FI access circuit corresponding to the second container in the N WI-FI access circuits.

Figure 3:
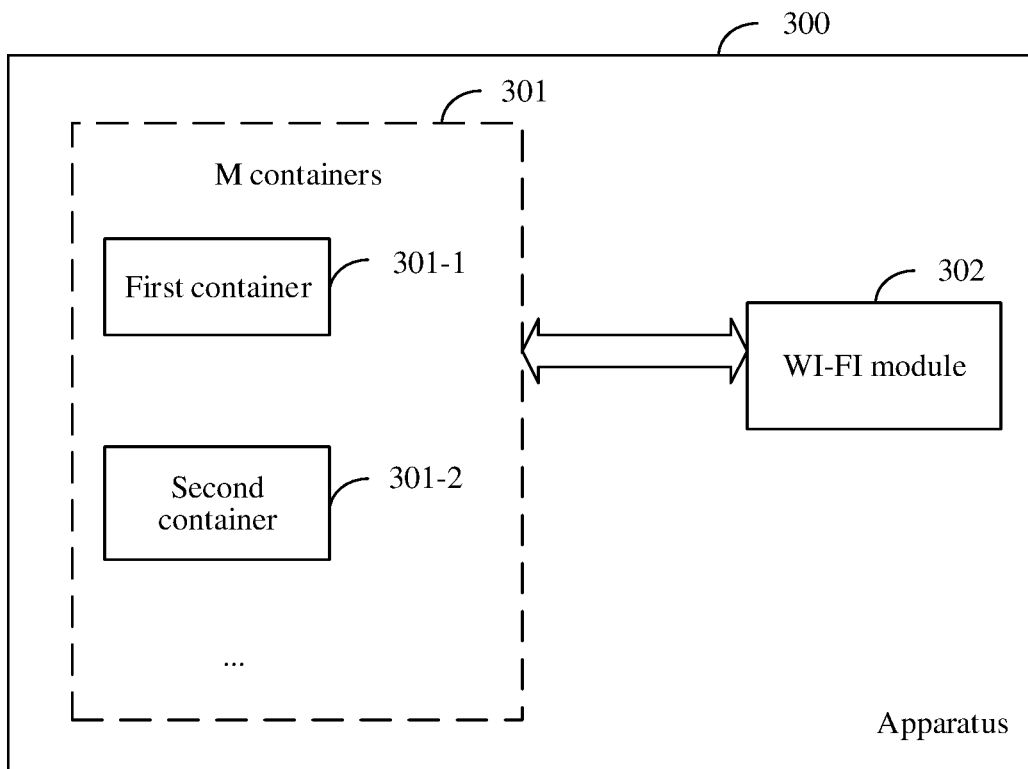
FIG. 3 is a schematic structural diagram of an apparatus for accessing a WI-FI network according to an embodiment of this application.

Based on the terminal shown in FIG. 1 and the method shown in FIG. 2, referring to FIG. 3, an embodiment of this application further provides an apparatus 300 for accessing a WI-FI network. The apparatus 300 includes M containers 301 that are capable of operating at the same time and a WI-FI module 302. Each container in the M containers 301 corresponds to one WI-FI network access service, tasks and data of different WI-FI network access services during operation of different M containers 301 are mutually isolated, and the M containers 301 include a first container 301-1 and a second container 301-2.

The WI-FI module 302 is configured to, when the first container 301-1 operates, access a first WI-FI network using a first WI-FI access circuit, and is further configured to, when the apparatus 300 switches from the operation of the first container 301-1 to the operation of the second container 301-2, access a second WI-FI network using a second WI-FI access circuit. The first container 301-1 is further configured to, when the WI-FI module 302 accesses the second WI-FI network using the second WI-FI access circuit, continue operating in a background running manner, and the WI-FI module 302 is further configured to continue using the first WI-FI access circuit to access the first WI-FI network.

M and N are natural numbers greater than or equal to 2, and M is equal to N.

Optionally, the WI-FI module 302 is configured to access the first WI-FI network according to a preset mapping relationship between containers and WI-FI access circuits using the first WI-FI access circuit corresponding to the first container 301-1.

The WI-FI module 302 is further configured to access the second WI-FI network according to the mapping relationship using the second WI-FI access circuit corresponding to the second container 301-2.

Optionally, the WI-FI module 302 is further configured to when accessing the first WI-FI network using the first WI-FI access circuit corresponding to the first container 301-1, perform at least one of channel resource scheduling, Media Access Control, or encryption/decryption related to accessing the first WI-FI network, and when accessing the second WI-FI network using the second WI-FI access circuit corresponding to the second container 301-2, perform at least one of channel resource scheduling, Media Access Control, or encryption/decryption related to accessing the second WI-FI network.

Optionally, each of the M containers 301 is configured to implement at least one of a user interface function of a corresponding WI-FI network access service, maintenance of an AP start state, or maintenance of a station peer to peer network start state.

Figure 4A:
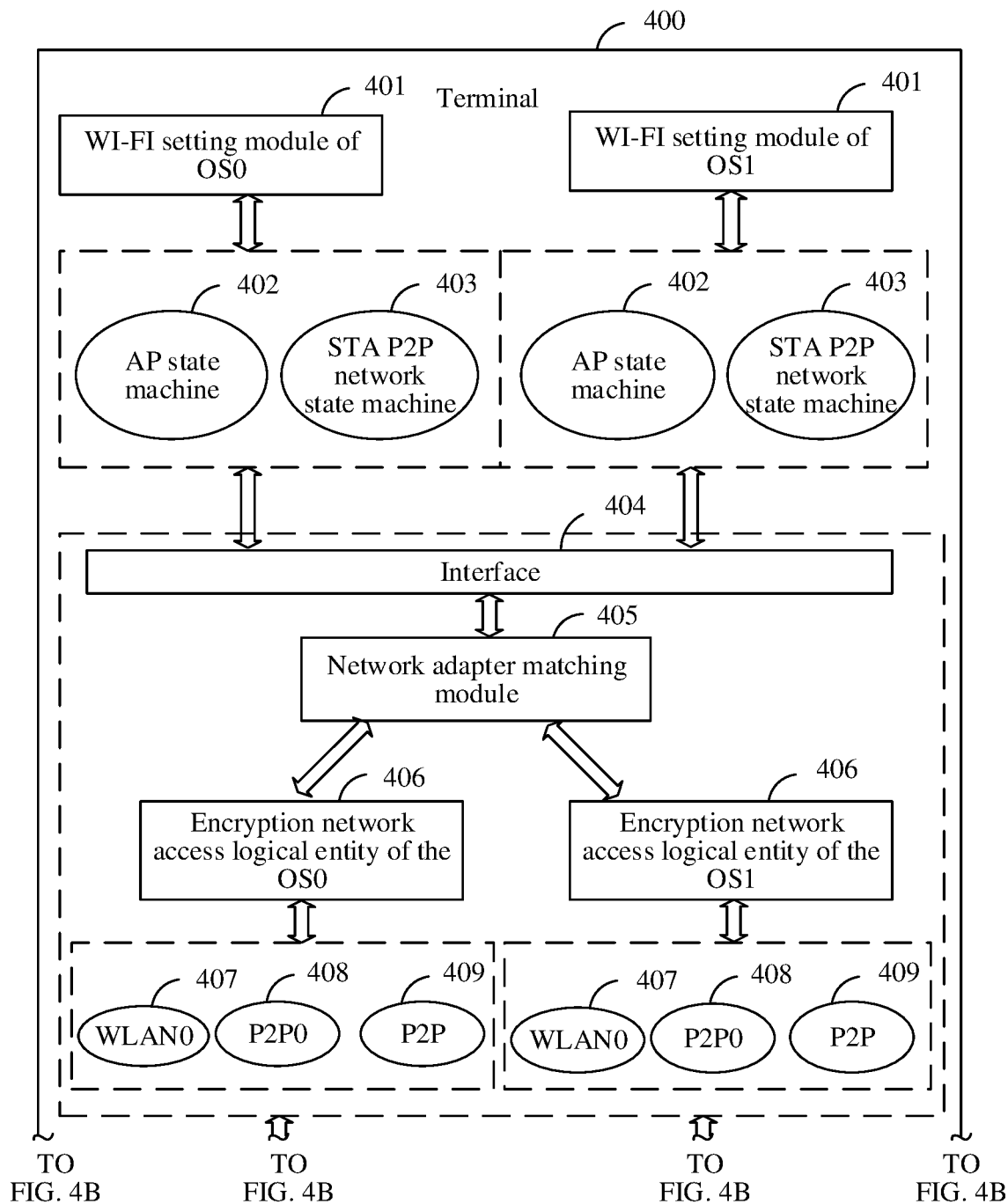

For better understanding of the terminal shown in FIG. 1, the method shown in FIG. 2, and the apparatus shown in FIG. 3 in the embodiments of this application, the following further describes an implementation of a terminal using a more detailed schematic diagram of an internal structure stack of a terminal shown in FIG. 4A and FIG. 4B.

As shown in FIG. 4A and FIG. 4B, a terminal 400 may use at least two operating systems. In FIG. 4A and FIG. 4B, an example in which two operating systems, OS0 and OS1 are used is used for description. For each operating system, the following modules are included a WI-FI setting module 401, an AP state machine 402, a station peer to peer (also referred to as STA P2P) network state machine 403, an interface 404, a network adapter matching module 405, an encryption network access logical entity 406, a WLAN0 407, a P2P0 408, a P2P 409, a scheduling module 410, a WI-FI protocol stack 411, and a WI-FI access circuit 412.

The WI-FI setting module 401 is a WI-FI utilization interface normally used on an intelligent terminal, that is, a user interface software, and is application software run by a main CPU.

The AP state machine 402 is used for logical implementation of an AP start state in an installation package of the terminal, is software run by the main CPU or a WI-FI CPU, is generally run by the main CPU, and is configured to receive a report from a bottom layer, obtain an access status such as a connected state or a disconnected state or connection signal strength of a WI-FI AP, and deliver the obtained access status of the WI-FI AP to the WI-FI setting module 401 such that the WI-FI setting module 401 displays the access status of the WI-FI AP on a user interface.

The station peer to peer network state machine 403 is used for logical implementation of a STA P2P connection status in the installation package of the terminal. Similar to the AP state machine, the STA P2P state machine is configured to obtain a status of a P2P point, that is, information about a peer device in WI-FI direct transmission, is software run by the main CPU or the WI-FI CPU, and is generally run by the main CPU.

It may be considered that the WI-FI setting module 401, the AP state machine 402, and the STA P2P state machine 403 corresponding to each operating system are included in one container and are run by the main CPU. The AP state machine 402 and the STA P2P state machine 403 learn an operating status of a WI-FI part (including a WI-FI processor and a WI-FI access circuit) by maintaining and managing the access status of the WI-FI AP and the connection status of the STA P2P such that a related status is conveniently delivered to the WI-FI setting module 401 at an upper layer, and the WI-FI setting module 401 can perform corresponding display.

The interface 404 is an interface logical protocol stack interface layer, and is only an interface for connecting an upper part and a lower part.

The network adapter matching module 405 is used for network adapter binding and distribution of called network interfaces, that is, used for implementing a correspondence between a high-layer container and a bottom-layer software module such as the encryption network access logical entity 406, the WLAN0 407, the P2P0 408, the P2P 409, the WI-FI protocol stack 411, and the WI-FI access circuit 412, and is software run by the WI-FI CPU.

The encryption network access logical entity 406 implements a WI-FI AP-mode encryption/decryption network access function, and is software run by the WI-FI CPU.

The WLAN0 407 is a WLAN communications entity, is software run by the WI-FI CPU, and implements a necessary software function required for WLAN communication.

The P2P0 408 is a P2P communications entity, is software run by the WI-FI CPU, and implements a necessary software function required for P2P communication.

The P2P 409 is a P2P scanning function, is software run by the WI-FI CPU, and implements a necessary software function required for P2P scanning.

The scheduling module 410 is configured to perform scheduling, including channel resource scheduling and the like, between two virtual APs based on one WI-FI CPU.

The WI-FI protocol stack 411 includes at least two independent MACs. In FIG. 4A and FIG. 4B, two MACs are used as an example. The MAC may be software run by the WI-FI CPU, or certainly, may be implemented using independent MAC hardware instead of WI-FI CPU software.

Software run by the WI-FI CPU may be collectively referred to as a WI-FI module, may selectively include the interface 404, the network adapter matching module 405, the encryption network access logical entity 406, the scheduling module 410, and the WI-FI protocol stack 411, and may further include the WLAN0 407, the P2P0 408, and the P2P 409.

At least two WI-FI access circuits 412 and the WI-FI CPU are all included in a WI-FI chip, and the at least two WI-FI access circuits 412 may include at least two independent PHY layers and at least two radio frequency components. For example, there are two WI-FI access circuits, a first WI-FI access circuit and a second WI-FI access circuit. It may be understood that the WI-FI access circuit 412 may be implemented using an integrated circuit, that is, the WI-FI CPU and the WI-FI access circuits including the independent PHY layers and the radio frequency components may be integrated into the WI-FI chip. In this way, the WI-FI access circuits and the WI-FI CPU form a complete processor, and the processor is integrated into a semiconductor chip using an integrated circuit technology. Alternatively, the WI-FI access circuit 412 may be an independent chip, and is implemented in separation from the WI-FI CPU. This is not limited in this embodiment.

Further, the terminal 400 may switch between the two operating systems, OS0 and OS1. Each operating system corresponds to operation in one container. As shown in FIG. 4A and FIG. 4B, there are two symmetrical parts. It may be considered that the terminal 400 may operate a virtual device corresponding to each part, that is, may operate a container corresponding to each part. A difference between center frequencies of channels used when two containers operate in the terminal 400 needs to be greater than a threshold, for example, needs to be at least 20 megahertz (MHz). Alternatively, the terminal 400 may use a same channel when two containers operates.

In an embodiment, when the terminal 400 starts, a WLAN and a P2P of the OS0, a WLAN and a P2P of the OS1, an encryption entity of the OS0, and an encryption entity of the OS1 start by default.

When the OS0 starts, an AP state machine 402 and a STA P2P network state machine 403 of the OS0 register with a network adapter matching module 405, and is associated with the corresponding encryption network access logical entity 406 of the OS0 such that a connection to the corresponding encryption network access logical entity 406 is established (certainly, the encryption network access logical entity 406 of the OS1 may be obtained such that a connection to the corresponding encryption network access logical entity 406 of the OS1 is established).

A start process of the OS1 is similar to the foregoing start process of the OS0, and details are not described herein again.

The network adapter matching module 405 needs to store an index of the encryption network access logical entity 406 and indexes of the AP state machine 402 and the STA P2P state machine 403 of the OS0, store a shared variable or a message queue that is used for state machine communication between the encryption network access logical entity 406 and both the AP state machine 402 and the STA P2P state machine 403 of the OS0, and store a connection relationship between each upper-layer state machine of the network adapter matching module 405 and the lower-layer encryption network access logical entity 406.

Calling a native interface includes calling an interface from the encryption network access logical entity 406 to each state machine and calling an interface from each state machine to the encryption network access logical entity 406, and the network adapter matching module 405 needs to be adaptive to the native interface using an incremental message mechanism or another process communication mechanism.

Exit logic is contrary to the foregoing start logic, and reference may be made to the foregoing start logic. Details are not described herein.

According to the terminal and the method and apparatus for accessing a WI-FI network provided in FIG. 1 to FIG. 4A and FIG. 4B, it can be ensured that a WI-FI network connection is not disconnected when a terminal switches between different operating systems such that WI-FI network application is safer, a service is more fluent, and user experience is improved.

In addition, in a public environment such as an airport or a shopping mall, because multiple WI-FI APs are disposed, when a user who holds a terminal moves from one area to another area, the terminal needs to switch from one WI-FI AP to another WI-FI AP. In this switch process, service disconnection is caused, and user experience is compromised.

In view of this, based on the terminal structure provided in FIG. 1, the embodiments of this application provide another method and apparatus for accessing a WI-FI network and another terminal such that one terminal can be connected to two or more different WI-FI APs, a WI-FI network is not disconnected during switch operation between two WI-FI APs, a service is more fluent, and user experience is improved.

In the terminal structure provided in FIG. 1, the at least one processor in the main chip 101 may run the software program to form at least two containers. Alternatively, certainly, the at least one processor in the main chip 101 may run the software program to form only one container, that is, a single-container mode is supported. Likewise, a single container may also be configured to implement at least one of a user interface function of a corresponding WI-FI network access service, maintenance of an AP start state, or maintenance of a station peer to peer network start state. A terminal mentioned in a method and an apparatus described in FIG. 5 to FIG. 8A and FIG. 8B in the embodiments of this application is for the single-container mode. In the single-container mode, two WI-FI network access identifiers may be conveniently displayed on a user interface or a display such that a user can conveniently learn connection statuses of two WI-FI networks, and user experience is improved.

Based on the terminal structure shown in FIG. 1, in the single-container mode, a container in the terminal 100 supports both a first WI-FI network access service and a second WI-FI network access service. The WI-FI CPU 104 is configured to when an access request for accessing the first WI-FI network is received, access the first WI-FI network using a first WI-FI access circuit in N WI-FI access circuits, and on condition of using the first WI-FI access circuit to access the first WI-FI network, if an access request for accessing the second WI-FI network is received, access the second WI-FI network using a second WI-FI access circuit in the N WI-FI access circuits. The at least one processor included in the main chip 101 is configured to drive a display interface corresponding to the container to synchronously display a first WI-FI network access identifier and a second WI-FI network access identifier. For the display interface, refer to a schematic diagram shown in FIG. 6. The first WI-FI network access identifier represents that the first WI-FI network is accessed, and the second WI-FI network access identifier represents that the second WI-FI network is accessed. N is a natural number greater than or equal to 2.

Optionally, the terminal 100 may further include a display 108, and the display interface corresponding to the container is displayed on the display 108.

The at least one processor in the main chip 101 is further configured to drive the display interface to synchronously display connection signal strength of the first WI-FI network and connection signal strength of the second WI-FI network.

Optionally, the WI-FI CPU 104 is further configured to after accessing the first WI-FI network and the second WI-FI network, select, according to a detected WI-FI network connection manner entered by a user, at least one of the first WI-FI network or the second WI-FI network to carry a data service. In addition, the WI-FI CPU 104 is further configured to perform at least one of channel resource scheduling, Media Access Control, or encryption/decryption related to accessing the first WI-FI network and the second WI-FI network.

Based on the terminal 100 in the single-container mode, referring to FIG. 5, a procedure of another method for accessing a WI-FI network provided in an embodiment of this application is as follows.

Step 500: When receiving an access request for accessing a first WI-FI network, a terminal accesses the first WI-FI network using a first WI-FI access circuit in N WI-FI access circuits.

Step 501: On condition of using the first WI-FI access circuit to access the first WI-FI network, if the terminal receives an access request for accessing a second WI-FI network, the terminal accesses the second WI-FI network using a second WI-FI access circuit in the N WI-FI access circuits.

N is a natural number greater than or equal to 2.

Figure 6:
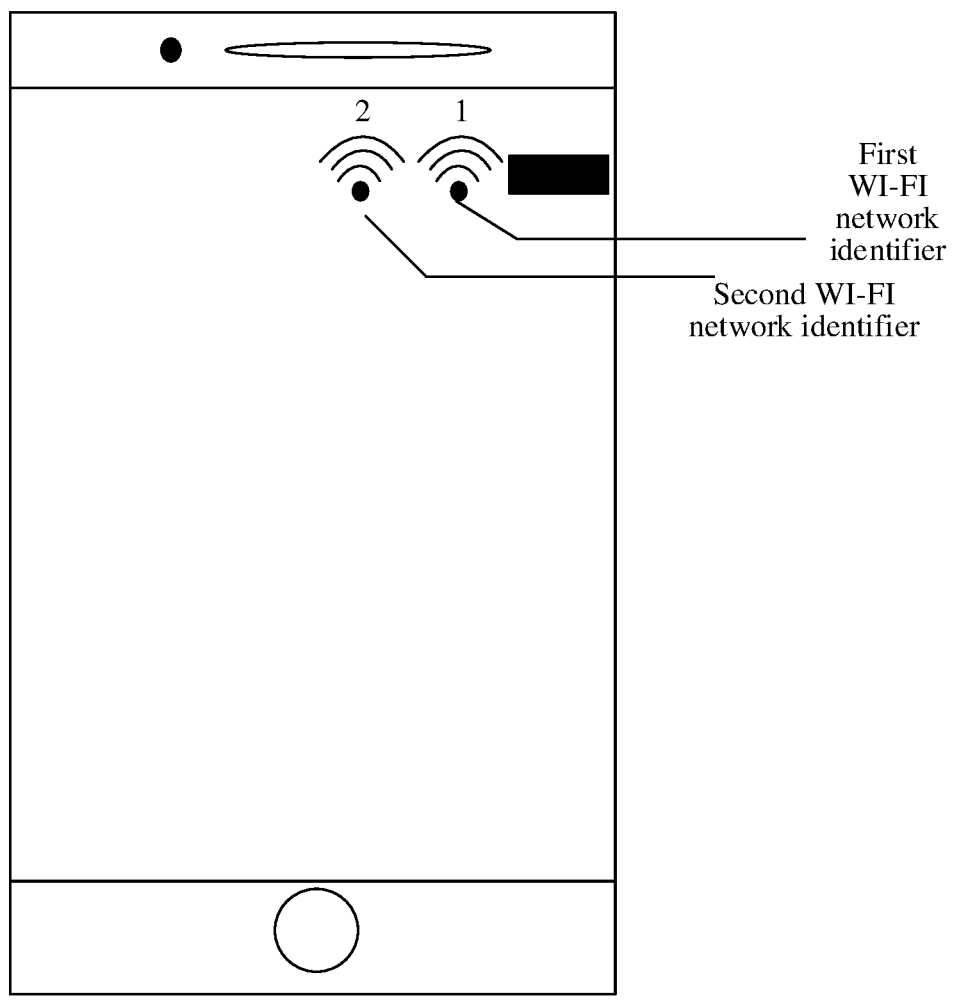
FIG. 6 is a schematic diagram of a terminal display interface according to an embodiment of this application.

After accessing the first WI-FI network and the second WI-FI network, the terminal synchronously displays a first WI-FI network access identifier and a second WI-FI network access identifier on a display interface. The display interface is shown in FIG. 6. The first WI-FI network access identifier represents that the first WI-FI network is accessed, and the second WI-FI network access identifier represents that the second WI-FI network is accessed.

Further, after accessing the first WI-FI network and the second WI-FI network, the terminal may synchronously display connection signal strength of the first WI-FI network and connection signal strength of the second WI-FI network on the display interface.

Optionally, a WI-FI network connection manner is pre-configured for the terminal. The WI-FI network connection manner is used by a user to select a WI-FI network to carry a data service. For example, the WI-FI network connection manner includes accessing a WI-FI AP with a strong signal, or accessing multiple WI-FI APs (for example, two WI-FI APs) at the same time, or accessing a designated WI-FI AP, or the like. The terminal selects, according to the detected WI-FI network connection manner entered by the user, at least one of the first WI-FI network or the second WI-FI network to carry the data service. Further, after accessing the first WI-FI network and the second WI-FI network, the terminal selects, from the first WI-FI network and the second WI-FI network according to the detected WI-FI network connection manner entered by the user, a WI-FI network having higher connection signal strength to carry the data service, or selects, according to the detected WI-FI network connection manner entered by the user, a WI-FI network designated by the user, to carry the data service, or selects, according to the detected WI-FI network connection manner entered by the user and according to a load balancing policy, the first WI-FI network and the second WI-FI network to carry the data service together.

That the first WI-FI network and the second WI-FI network are selected according to the load balancing policy to carry the data service together may include but be not limited to the following several cases.

The terminal uses, according to a traffic balancing policy of the first WI-FI network and the second WI-FI network, the first WI-FI network and the second WI-FI network to carry the data service, or the terminal uses, according to a service request quantities balancing policy of the first WI-FI network and the second WI-FI network, the first WI-FI network and the second WI-FI network to carry the data service.

It can be learned from the method shown in FIG. 5 that, when the terminal has accessed one network, the terminal may further access another network while maintaining the one network access service. The two WI-FI networks use different WI-FI access circuits to operate, and therefore, it can be ensured that the two WI-FI networks are online at the same time. The foregoing manner may also be referred to as a WI-FI dual standby manner. Certainly, in the foregoing method, an extended case is that more than two WI-FI networks are online at the same time. In this way, if the terminal is connected to two WI-FI networks at the same time, when a user who holds the terminal moves from one area to another area, it can be ensured that a WI-FI network connection is not disconnected, it can be ensured that a service is not disconnected, and user experience can be improved.

Figure 7:
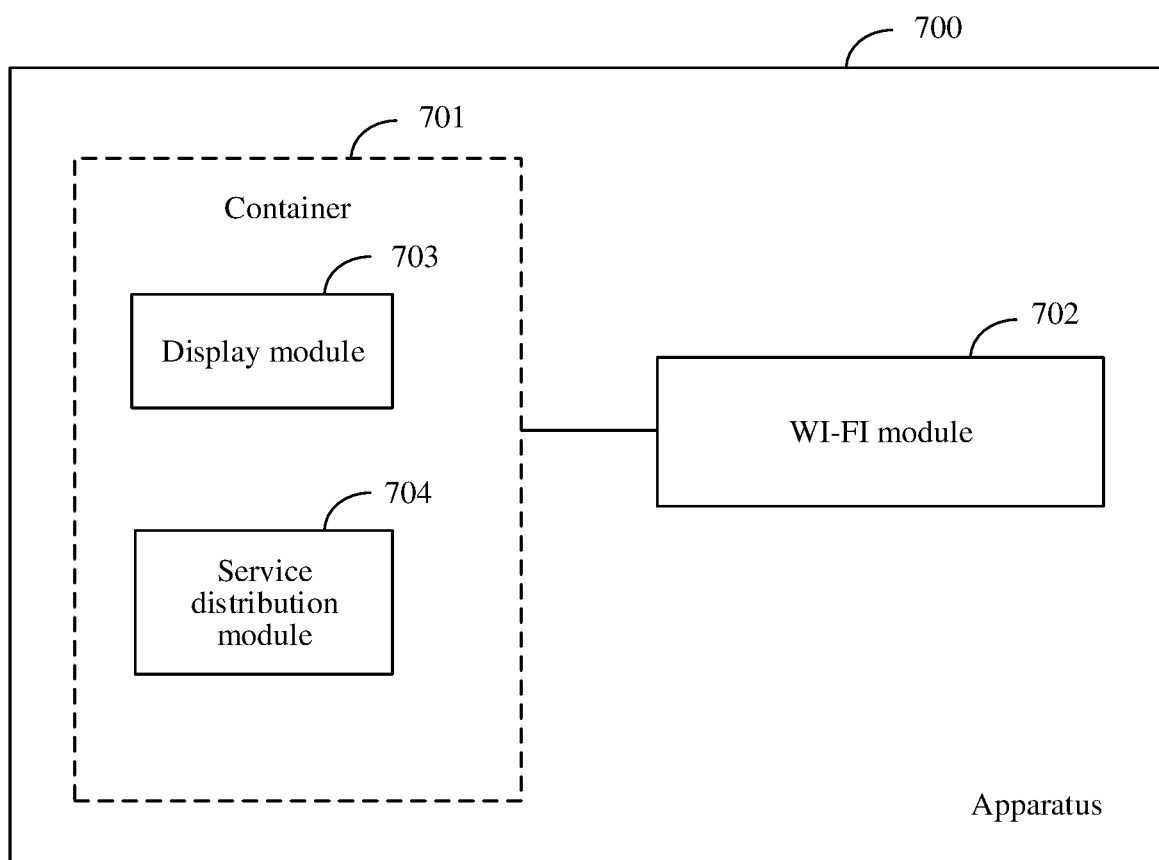
FIG. 7 is a schematic structural diagram of an apparatus for accessing a WI-FI network according to an embodiment of this application.

Based on the method for accessing a WI-FI network shown in FIG. 5, referring to FIG. 7, an embodiment of this application further provides an apparatus 700 for accessing a WI-FI network. The apparatus 700 includes a container 701 supporting both a first WI-FI network access service and a second WI-FI network access service and a WI-FI module 702. The container 701 includes a display module 703.

The WI-FI module 702 is configured to access the first WI-FI network using a first WI-FI access circuit in N WI-FI access circuits when an access request for accessing a WI-FI network is received, and on condition of using the first WI-FI access circuit to access the first WI-FI network, if an access request for accessing the second WI-FI network is received, access the second WI-FI network using the second WI-FI access circuit. N is a natural number greater than or equal to 2.

The display module 703 is configured to synchronously display a first WI-FI network access identifier and a second WI-FI network access identifier on a display interface corresponding to the container after the WI-FI module accesses the first WI-FI network and the second WI-FI network. The first WI-FI network access identifier represents that the first WI-FI network is accessed, and the second WI-FI network access identifier represents that the second WI-FI network is accessed.

Optionally, the display module 703 is further configured to synchronously display connection signal strength of the first WI-FI network and connection signal strength of the second WI-FI network on the display interface.

Optionally, the apparatus 700 or the container 701 further includes a service distribution module 704. The service distribution module 704 may be a part of an operating system, that is, the container 701 includes the service distribution module 704, or certainly, may be a part of software run by a WI-FI CPU. For example, in FIG. 7, the service distribution module 704 exists in the container 701. The service distribution module 704 is configured to after the WI-FI module accesses the first WI-FI network and the second WI-FI network, select, according to a detected WI-FI network connection manner entered by a user, at least one of the first WI-FI network or the second WI-FI network to carry a data service.

The service distribution module 704 is further configured to detect the WI-FI network connection manner entered by the user, and select, from the first WI-FI network and the second WI-FI network according to the detected WI-FI network connection manner entered by the user, a WI-FI network having higher connection signal strength to carry the data service, select, according to the detected WI-FI network connection manner entered by the user, a WI-FI network designated by the user, to carry the data service, or select, according to the detected WI-FI network connection manner entered by the user and according to a load balancing policy, the first WI-FI network and the second WI-FI network to carry the data service together.

The service distribution module 704 uses, according to a traffic balancing policy of the first WI-FI network and the second WI-FI network, the first WI-FI network and the second WI-FI network to carry the data service, or uses, according to a service request quantities balancing policy of the first WI-FI network and the second WI-FI network, the first WI-FI network and the second WI-FI network to carry the data service.

Optionally, the WI-FI module 702 is further configured to perform at least one of channel resource scheduling, Media Access Control, or encryption/decryption related to accessing the first WI-FI network and the second WI-FI network.

Optionally, the container 701 is configured to implement at least one of a user interface function of a corresponding WI-FI network access service, maintenance of an AP start state, or maintenance of a station peer to peer network start state.

Figure 8A:
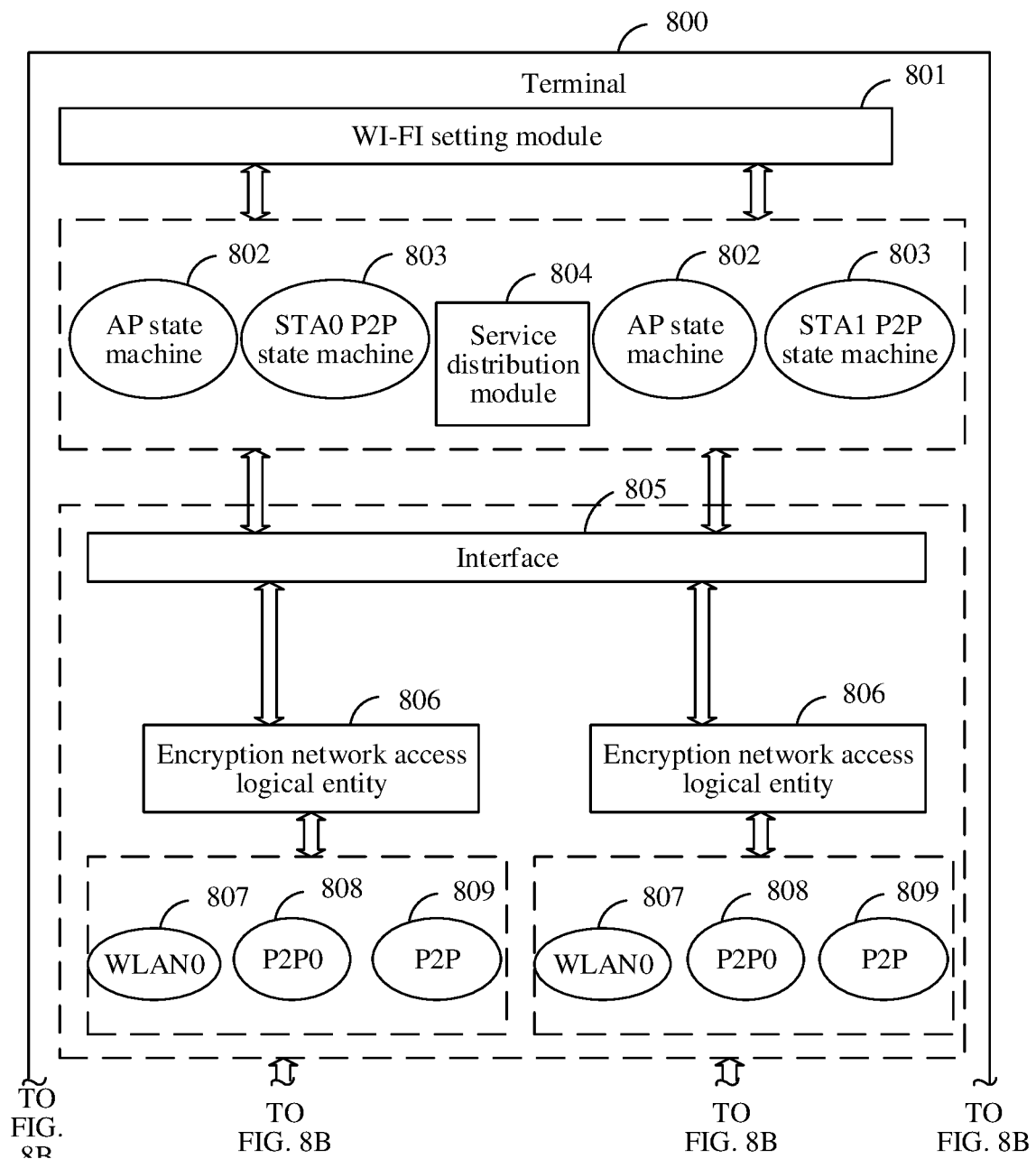
FIG. 8A and FIG. 8B are a schematic diagram of an internal structure stack of a terminal according to an embodiment of this application.
Figure 8B:
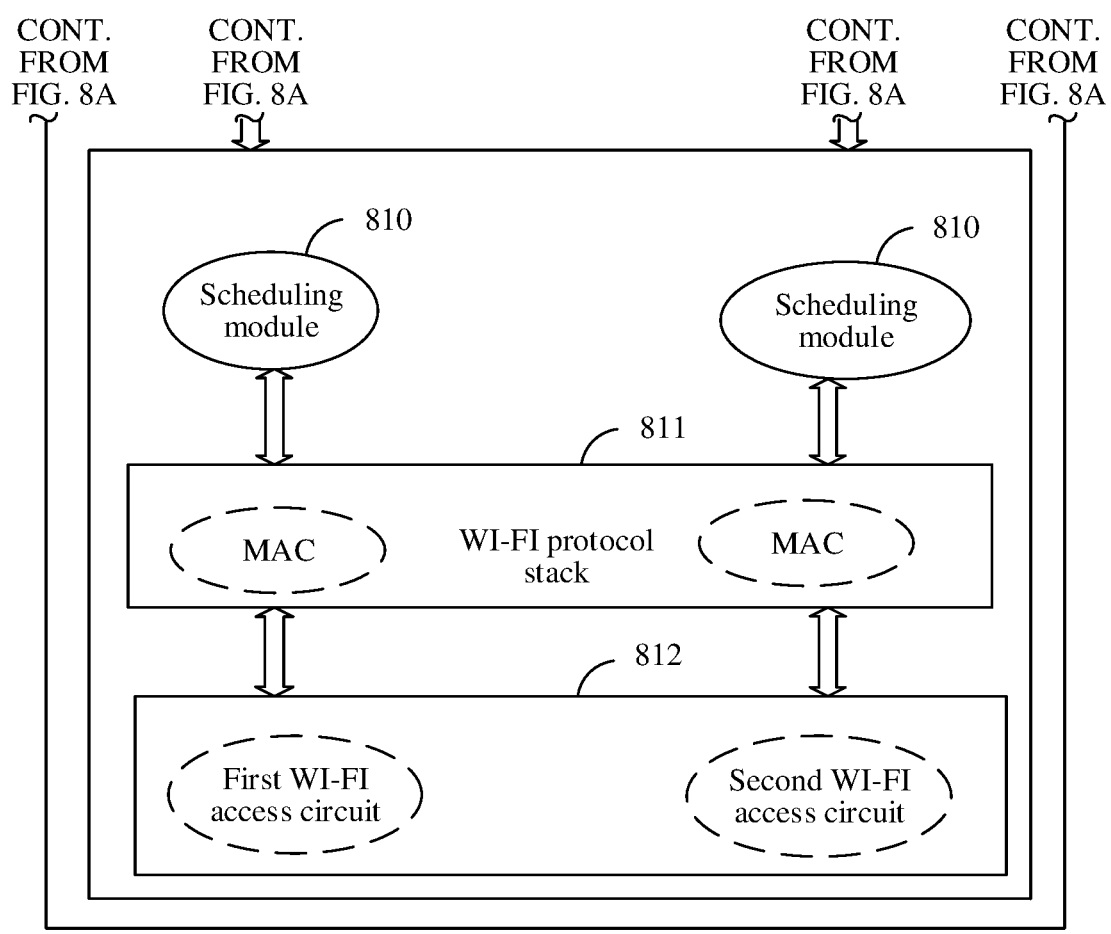

For better understanding of the method and the apparatus shown in FIG. 5 to FIG. 7 in the embodiments of this application, the following further describes an implementation of a terminal using a more detailed schematic diagram of an internal structure stack of a terminal shown in FIG. 8A and FIG. 8B.

As shown in FIG. 8A and FIG. 8B, a terminal 800 includes a WI-FI setting module 801, at least two AP state machines 802 (two AP state machines are used as an example in the figure), at least two STA P2P state machines 803 (two STA P2P state machines are used as an example in the figure), a service distribution module 804, an interface 805, at least two encryption network access logical entities 806 (two encryption network access logical entities are used as an example in the figure), at least two WLAN0s 807 (two WLAN0s are used as an example in the figure), at least two P2P0s 808 (two P2P0s are used as an example in the figure), at least two P2Ps 809 (two P2Ps are used as an example in the figure), at least two scheduling modules 810, a WI-FI protocol stack 811 (two WI-FI protocol stacks are used as an example in the figure), and a WI-FI access circuit 812. The WI-FI setting module 801, the at least two AP state machines 802, and the at least two STA P2P state machines 803 may be included in one container, and run by a CPU. Optionally, the service distribution module 804 is also included in the container. Alternatively, the service distribution module 804 may be run by a WI-FI CPU. The WI-FI CPU is further configured to run and implement the interface 805, the at least two encryption network access logical entities 806, the at least two WLAN0s 807, the at least two P2P0s 808, the at least two P2Ps 809, the at least two scheduling modules 810, and the WI-FI protocol stack 811. The WI-FI CPU and the WI-FI access circuit 812 may be integrated into a WI-FI chip, or may be implemented separately.

A module that has a same module name as that of a module in FIG. 4A and FIG. 4B also has a same function as that of the module in FIG. 4A and FIG. 4B, and details are not described herein again. Differently, the terminal 800 shown in FIG. 8A and FIG. 8B may operate one operating system, that is, may operate in a single-container mode. Therefore, one WI-FI setting module 801 is included in FIG. 8A and FIG. 8B, that is, setting is performed using a setting interface of one operating system. Likewise, it can be learned from FIG. 8A and FIG. 8B that it may be considered that the terminal 800 has two channels that share one CPU. One channel may be corresponding to accessing one WI-FI network, the single container of the terminal 800 may use either of the channels, and when using the two channels at the same time according to an appropriate software design, the terminal 800 can be connected to two WI-FI networks at the same time, that is, implement a WI-FI dual standby function. Likewise, a terminal with more than two channels can implement a WI-FI multi-standby function. In this embodiment, two channels are used as an example, and are not intended to limit the protection scope.

The service distribution module 804 is configured to execute a function executed by the service distribution module 704 in FIG. 7. In this embodiment of this application, the terminal may use different WI-FI access circuits for different services in one operating system using the added service distribution module such that a concurrent function that multiple WI-FI networks are used for multiple services is implemented, and one terminal can be connected to two or more different WI-FI APs at the same time, that is, a WI-FI dual standby or multi-standby function is implemented. In addition, a new interface manner is provided such that at least two WI-FI identifiers can be displayed on a display interface of the terminal, and a display manner of WI-FI dual standby display or WI-FI multi-standby display is implemented.

Persons skilled in the art should understand that the embodiments of this application may be provided as a method, a system, or a computer program product. Therefore, a part of content in the method designed in this application may be implemented using software, or in a form of embodiments with a combination of software and hardware. Moreover, this application may use a form of a computer program product that is implemented on one or more computer-usable storage media (including but not limited to a disk memory, a compact disc read-only memory (CD-ROM), an optical memory, and the like) that include computer usable program code. For example, a software-driven program, such as an operating system program, or container software, or necessary software required by a WI-FI CPU, that is executed by a main CPU or the WI-FI CPU may be stored in the storage media, and executed by a corresponding processor.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provides steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. An apparatus for accessing a wireless fidelity (WI-FI) network, comprising:
   N WI-FI access circuits; and
   at least one processor configured to run a software program to form a container supporting both a first WI-FI network access service and a second WI-FI network access service; and
   a WI-FI processor configured to:
      access a first WI-FI network using a first WI-FI access circuit of the N WI-FI access circuits when an access request for accessing the first WI-FI network is received; and
      access a second WI-FI network using a second WI-FI access circuit of the N WI-FI access circuits on a condition of using the first WI-FI access circuit to access the first WI-FI network in response to an access request for accessing the second WI-FI network being received,
   wherein the at least one processor is further configured to drive a display interface corresponding to the container to synchronously display a first WI-FI network access identifier and a second WI-FI network access identifier, wherein the first WI-FI network access identifier represents that the first WI-FI network is accessed, wherein the second WI-FI network access identifier represents that the second WI-FI network is accessed, and wherein N is a natural number greater than or equal to 2.

2. The apparatus of claim 1, wherein the at least one processor is further configured to drive the display to synchronously display connection signal strength of the first WI-FI network and connection signal strength of the second WI-FI network on the display interface.

3. The apparatus of claim 1, wherein the WI-FI processor is further configured to select, according to a detected WI-FI network connection manner from a user, at least one of the first WI-FI network or the second WI-FI network to carry a data service after the WI-FI processor accesses the first WI-FI network and the second WI-FI network.

4. The apparatus of claim 1, wherein the WI-FI processor is further configured to perform channel resource scheduling.

5. The apparatus of claim 1, wherein the WI-FI processor is further configured to perform Media Access Control.

6. The apparatus of claim 1, wherein the WI-FI processor is further configured to perform encryption and decryption that are related to accessing the first WI-FI network and the second WI-FI network.

7. The apparatus of claim 1, wherein the container is further configured to implement a user interface function of a corresponding WI-FI network access service.

8. The apparatus of claim 1, wherein the container is further configured to implement maintenance of an access point (AP) start state.

9. The apparatus of claim 1, wherein the container is further configured to implement maintenance of a station peer to peer network start state.

10. The apparatus of claim 1, wherein the first WI-FI network and second WI-FI network operate on different radio frequency bands.

11. A method for accessing a wireless fidelity (WI-FI) network, comprising:

running a software program to form a container, wherein the container supports both a first WI-FI network access service and a second WI-FI network access service;

accessing a first WI-FI network using a first WI-FI access circuit of N WI-FI access circuits when an access request for accessing the first WI-FI network is received, wherein N is a natural number greater than or equal to 2;

accessing a second WI-FI network using a second WI-FI access circuit of the N WI-FI access circuits on a condition of using the first WI-FI access circuit to access the first WI-FI network in response to an access request for accessing a second WI-FI network being received; and driving a display interface corresponding to the container to synchronously display a first WI-FI network access identifier and a second WI-FI network access identifier, wherein the first WI-FI network access identifier represents that the first WI-FI network is accessed, and wherein the second WI-FI network access identifier represents that the second WI-FI network is accessed.

12. The method of claim 11, further comprising driving the display to synchronously display connection signal strength of the first WI-FI network and connection signal strength of the second WI-FI network on the display interface.

13. The method of claim 11, further comprising selecting, according to a detected WI-FI network connection manner from a user, at least one of the first WI-FI network or the second WI-FI network to carry a data service after accessing the first WI-FI network and the second WI-FI network.

14. The method of claim 11, further comprising performing at least one of channel resource scheduling, Media Access Control, encryption, or decryption that are related to accessing the first WI-FI network and the second WI-FI network.

15. The method of claim 11, wherein the container is configured to implement at least one of a user interface function of a corresponding WI-FI network access service, maintenance of an access point (AP) start state, or maintenance of a station peer to peer network start state.

16. The method of claim 11, wherein the first WI-FI network and second WI-FI network operate on different radio frequency bands.

* * * * *